US005630398A

United States Patent [19]

Gant et al.

[11] Patent Number: 5,630,398

[45] Date of Patent: May 20, 1997

[54] STEPPED ROTATION FUEL DISTRIBUTION VALVE

[75] Inventors: Gary L. Gant; George L. Muntean; Harry L. Wilson; John R. Youngblood; Mark S. Cavanagh, all of Columbus, Ind.

[73] Assignee: Cummins Engine Company, Inc., Columbus, Ind.

[21] Appl. No.: 658,574

[22] Filed: Jun. 5, 1996

[51] Int. Cl.[6] .......................... F02M 41/00; F16K 11/076

[52] U.S. Cl. ....................................... 123/450; 137/625.11

[58] Field of Search .................................... 123/448–450, 123/452, 498–499; 137/625.11, 565.1

[56] References Cited

U.S. PATENT DOCUMENTS

| | | | |
|---|---|---|---|
| 3,972,350 | 8/1976 | Pickett | 137/625.11 |
| 4,363,211 | 12/1982 | Robinson et al. | 60/476 |
| 4,426,911 | 1/1984 | Robinson et al. | 91/35 |
| 4,428,511 | 1/1984 | Howell | 137/625.11 |
| 5,341,834 | 8/1994 | Doherty et al. | 137/625.11 |

*Primary Examiner*—Thomas N. Moulis

*Attorney, Agent, or Firm*—Sixbey, Friedman, Leedom & Ferguson; Charles M. Leedom, Jr.; Thomas W. Cole

[57] ABSTRACT

A stepped rotation fuel distribution valve for receiving and conducting metered, pressurized fuel pulses to the combustion cylinders of a diesel engine is provided. The valve includes a fuel distribution shaft rotatably mounted in a valve housing. The shaft includes a fuel discharge port that is sequentially registrable with fuel distributing passages in the housing that ultimately lead to the diesel fuel injectors associated with the combustion cylinders of the engine. A drive mechanism, which may include a stepper motor, intermittently rotates the fuel distributor shaft so that the shaft discharge port dwells in registration with one of the fuel distributing passages at the time a pressurized pulse of fuel is discharged through the shaft discharge port. The drive mechanism may also include either a set of timing gears or a spring coupling to achieve the desired intermittent rotation. In all cases, the intermittent rotation of the fuel distribution shaft prevents the shaft from rotating at a time when the discharge of a highly pressurized fuel pulse applies a high side load to the shaft which in turn can generate high frictional forces between the fuel distribution shaft and the surrounding housing.

20 Claims, 4 Drawing Sheets

STEPPED ROTATION FUEL DISTRIBUTION VALVE

TECHNICAL FIELD

This invention generally relates to a high pressure fuel system for an internal combustion engine and is particularly concerned with a stepped rotation fuel distribution valve that avoids valve shaft wear caused by high side loading of the shaft during rotation of the shaft.

BACKGROUND OF THE INVENTION

High pressure fuel systems for diesel engines are known in the art. An example of such a fuel system is disclosed and claimed in U.S. Pat. No. 5,042,445 to Peters et al. and assigned to Cummins Engine Company. This patent discloses a cam driven unit injector having a pump that provides very high injection pressures (30,000 psi or higher) even at low engine speeds. Such high pressures promote better fuel vaporization during injection of the fuel in the cylinders thereby helping to complete combustion and thus reduce emissions in the engine exhaust. In view of the implementation of government regulations requiring reduced emissions in the engine exhaust, there is a considerable interest in the engine manufacturing industry to develop and refine such high pressure fuel systems.

While such systems have proven their practicality in the field, the applicants have noted an aspect of these systems which could bear improvement. Specifically, all high pressure fuel systems of which the applicants are aware of utilize a conventional fuel distribution valve for sequentially directing a pulse of pressurized diesel fuel to the particular fuel injector associated with the combustion cylinders of the engine. Such distribution valves include a fuel distribution shaft that is rotatably mounted in a bore in the valve body. The fuel distribution shaft includes axially spaced fuel inlet and outlet ports along one of its sides. These ports communicate with one another by means of an axial bore in the shaft. When the shaft is inserted into the valve body, the fuel inlet port communicates with an annulus in the valve body that in turn is connected to the output of a high pressure pump that generates the pressurized pulses of diesel fuel. The fuel outlet port of the shaft is sequentially registrable with a plurality of fuel distribution passages whose inlets are angularly spaced around the inner diameter of the shaft receiving bore in the valve body. These passages diverge from the bore in the valve body like spokes and ultimately communicate with the fuel injectors that feed vaporized fuel into the combustion cylinders. In operation, the fuel distribution shaft is linked to the crankshaft of the diesel engine so as to continuously rotate along with the crankshaft. The pressurized pulses of fuel are generated as the fuel distribution port of the rotating shaft comes into registration with one of the fuel receiving passages in the valve body in order to sequentially transfer pulses of fuel to the various fuel injectors in the engine.

While such fuel distribution valves work well in diesel engines employing conventional pressure fuel distribution systems, the inventors have observed that the fuel distribution shaft in such valves may exhibit excessive wear in high pressure fuel systems, and may even seize or fall over time. The applicants have further discovered that such excessive wear is caused by the high side loading on the fuel distribution shaft that takes place when the fuel pulses are pumped into the valve body at high pressures (i.e., between 20,000 psi and 30,000 psi). The high pressure associated with the discharge of such a fuel pulse causes the side of the fuel distribution shaft opposite the fuel distributing port to push tightly against the inner diameter of the surrounding bore of the valve body, thereby breaking through the film of lubricant normally present. The friction generated from the resulting metal-to-metal contact may cause excessive wear on the shaft, which can ultimately result in shaft seizure and valve failure.

Clearly, there is a need for an improved fuel distribution valve that avoids the problem of excessive valve shaft wear when used in a high-pressure fuel system. Ideally, such a fuel distribution valve should be reliable, simple in structure, and capable of avoiding high side loading of the valve shaft over a broad range of engine speeds. It would further be desirable if such a fuel distribution valve was compatible with a broad range of different diesel engine designs.

SUMMARY OF THE INVENTION

Generally speaking, the invention is a fuel distribution valve that avoids the shortcomings associated with the prior art by a stepped rotation of the fuel distribution shaft that prevents the shaft from rotating during a high side load.

The fuel distribution valve of the invention comprises a distributor housing having an elongated bore, a fuel conducting passage in communication with a side portion of the bore for receiving metered, pressurized pulses of fuel, and a plurality of fuel distributing passages in communication with another side portion of the bore. The valve further comprises a fuel distribution shaft rotatably mounted in the bore that includes axially spaced, mutually communicating fuel receiving and fuel discharging ports in a side of the shaft that are sequentially registrable with the fuel receiving and fuel distributing passages of the housing as the shaft rotates. Most importantly, the valve comprises a drive mechanism for intermittently rotating the fuel distributor shaft so that the shaft discharge port dwells in registration with one of the fuel distributing passages whenever a pressurized pulse of fuel is discharged from the discharge port. Because the time period of the dwell is equal to or larger than the time period it takes for the pressurized fuel pulse to be completely discharged from the distributor shaft, the shaft is not rotated at the time the pulse creates a high side load on the shaft. Instead, the shaft is rotated in a stepped fashion only between fuel pulses when the fuel pressure is too low to exert any significant side load on the shaft.

In the preferred embodiment, the drive mechanism includes a stepper motor coupled to the fuel distribution shaft and electrically connected to a timing control circuit. The timing control circuit intermittently actuates the stepper motor only in time periods between the discharge of pressurized pulses of fuel. The drive mechanism may further include a microprocessor having an output electrically connected to a switching circuit for controlling a flow of electric power to the stepper motor. An encoder assembly is connected to the input of the microprocessor that generates an electrical signal whenever the angular position of the fuel distribution shaft corresponds to a registration position between the shaft discharge port and one of the distribution passageways. The encoder assembly may also be used to generate a signal indicative of the speed of the engine crankshaft. In operation, the microprocessor determines the dwell periods, dwell positions, and average angular speed of the fuel distribution shaft from information received from the encoder and the engine speed sensor.

In another embodiment of the invention, the drive mechanism includes a gear train having a drive gear connected to a drive shaft, and a timing gear connected to the fuel distribution shaft. The drive shaft may in turn be directly connected to the crankshaft of the engine. The ratio of teeth in the timing gear and the teeth in the drive gear is selected so that the fuel distribution shaft dwells whenever its fuel discharge port is rotated into registry with one of the fuel distribution passageways of the valve housing. The mechanical linkage between the crankshaft and the drive shaft provides a drive mechanism that is simple in structure, and which automatically adjusts itself in response to increased engine speed.

In a third embodiment of the invention, the drive mechanism is a spring coupling connected between a drive shaft that is ultimately connected to the crankshaft of the engine, and a driven shaft connected to the fuel distribution shaft. The spring coupling includes a torsional spring assembly having an arcuate stroke equal to the angular distance between two adjacent fuel distributing passages in the valve housing. In operation, the engine crankshaft continuously rotates the drive shaft of the mechanism. However, the frictional engagement between the fuel distribution shaft and the bore in the valve housing caused whenever a pressurized pulse of fuel is discharged from the shaft causes the shaft to dwell whenever its discharge port is in registration with a fuel distribution passageway. All during this dwell period, the continuous rotation of the drive shaft compresses the torsional spring assembly of the coupling which in turn exerts an increasing amount of torsional force onto the driven shaft. At the termination of the fuel pulse, the frictional force abates, and allows the restorative forces in the spring assembly to rotate the shaft into the next registration position, whereupon the dwell operation is repeated.

In all three embodiments, the drive mechanism prevents the fuel distribution shaft from rotating during the discharge of a pressurized pulse of fuel which creates high side loading and hence high frictional forces between the fuel distribution shaft and the surrounding housing bore.

BRIEF DESCRIPTION OF THE SEVERAL FIGURES

DETAILED DESCRIPTION OF THE PREFERRED EMBODIMENT

Figures 1A, 1B:
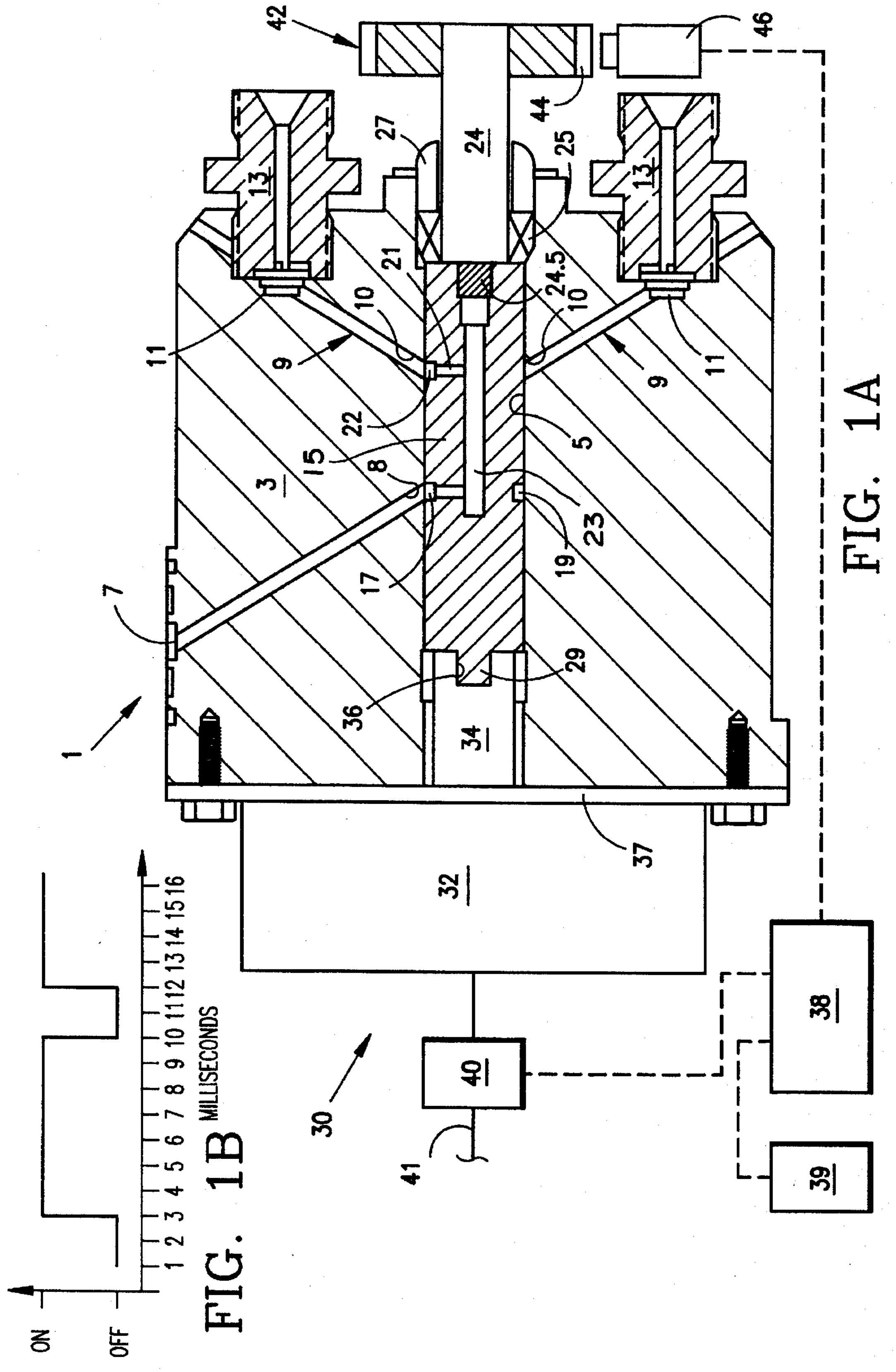
FIG. 1A is a side, cross-sectional view of a first embodiment of a fuel distribution valve of the invention that employs the use of a stepper motor in its drive mechanism.
FIG. 1B is a graph illustrating the flow of current over time to the stepper motor used in the first embodiment.

With reference now to FIG. 1, wherein like numerals designate like components throughout all the several Figures, the fuel distribution valve 1 of the invention is generally formed from a distributor housing 3 having a cylindrical bore 5 for receiving a fuel distribution shaft. The upper portion of the distributor housing 3 includes a fuel receiving passage 7 that terminates at the shaft receiving bore 5 at outlet 8. The housing 3 further includes a plurality of fuel distributing passages 9 that radiate away from the bore 5 in spoke-like fashion. The fuel distributing passages 9 have inlets 10 which are uniformly spaced around the circumference of the cylindrical shaft receiving bore 5. Each of the fuel distributing passages 9 further includes an outlet that terminates at a snubber valve 11 connected to a coupling 13. Each of the couplings 13 is ultimately connected to a fuel injector (not shown) that supplies diesel fuel to one of the several cylinders of a diesel engine.

A cylindrical fuel distribution shaft 15 is rotatably mounted within the bore 5. Shaft 15 includes a fuel receiving port 17 surrounded by an annular recess 19 which is always in communication with the outlet 8 of the fuel receiving passage 7, regardless of the angular position of the shaft 15. Shaft 15 further has a fuel discharge port 21 having an outlet 22 that is sequentially registrable with each of the inlets 10 of the fuel distributing passages 9. An axially oriented bore 23 interconnects the fuel receiving port 17 with the fuel discharge port 21. At its distal end, the fuel distribution shaft 15 includes a shaft extension 24 as shown. Shaft extension 24 has a smaller diameter than the main fuel distribution shaft 15, and is screwed therein via threaded portion 24.5. Shaft extension 24 is journaled in a bearing 25 and seal ring 27 in order to reduce the friction associated with the rotation of the shafts 15 and 24, and to minimize fuel leakage, respectively. The proximal end of the shaft 15 includes a keyway 29 for a purpose which will become evident shortly.

Valve 1 of the invention further includes a drive mechanism 30 for steppingly and sequentially rotating the fuel discharge port 21 of the fuel distribution shaft 15 into registration with the various fuel distributing passages 9. To this end, drive mechanism 30 is formed from a stepper motor 32 having an output shaft 34 that turns one angular increment upon the receipt of a pulse of electricity. The output shaft 34 of the motor 32 includes a recess which is complementary in shape to the previously mentioned keyway 29 of shaft 15. The face of the motor 32 is provided with an annular mounting flange 37 which is connected to the proximal end of the distributor housing 3 by means of bolts as shown.

In this embodiment of the valve 1, a microprocessor 38 controls the step-wise rotation of the shaft 34 of the motor 32. In the preferred embodiment, microprocessor 38 is a Model No. CM500 engine control module manufactured by Motorola for the Cummins Engine Company located in Columbus, Ind. Microprocessor 38 has an output that is connected to a switching circuit 40 that controls a flow of pulsing electrical current to the motor 32. Microprocessor 38 further has an input connected to an engine speed sensor 39 that informs it of the rpms and angular position of the engine crankshaft, from which the timing of the fuel pulses may be calculated since the injection pump (not shown) that generates these pulses is gear-linked to the engine crankshaft. The input of microprocessor 38 is also connected to an encoder assembly 42 that informs it as to the angular position of the fuel distribution shaft 15. The encoder assembly 42 includes an encoder gear 44 connected onto the proximal end of the shaft extension 24. Assembly 42 further includes a magnetic sensor 46 that generates an electrical pulse every time one of the teeth of the timing gear 44 passes through its vicinity.

In operation, the microprocessor 38 continuously receives electrical signals from the engine speed sensor 39 indicative of engine speed and crankshaft position. Microprocessor 38 also receives signals from the magnetic sensor 46 indicative that a particular tooth of the encoder gear 44 has just passed over it. From this information, the microprocessor 38 computes (1) the position of the outlet 22 of the fuel discharge port 21 of shaft 15 relative to the inlet 10 of the nearest fuel distributing passage 9 in the housing 3, as well as (2) the timing of the fuel pulses entering the fuel receiving passage 7. From these computations, the microprocessor 38 controls the switching circuit 40 that admits alternating current to the stepper motor 32 such that output shaft 34 dwells when fuel discharge port 21 is in registration with the inlet 10 of one of the fuel distributing passages 9. The period of the dwell is long enough for the pressurized pulse of fuel to travel completely through the inlet 10 before the shaft 15 is again moved. In a six cylinder diesel engine operating at a rate of approximately 2500 rpms, the dwell period will be approximately 2 milliseconds, while the time period taken for moving the port 15 to the inlet 10 of another fuel distributing passage 9 will be about 6 milliseconds. This process is repeated every 60 angular degrees of movement of the shaft 15. In view of the relatively quick stopping and starting movements that the stepper motor 32 must generate, a four or eight phase high torque motor operated by an electrical current having a frequency of approximately 150 hertz is preferred. Additionally, the switching circuit 40 should be operated in conjunction with ramping software of a type known in the art to avoid overshooting of the output shaft 34.

Figures 2A, 2B, 2C:
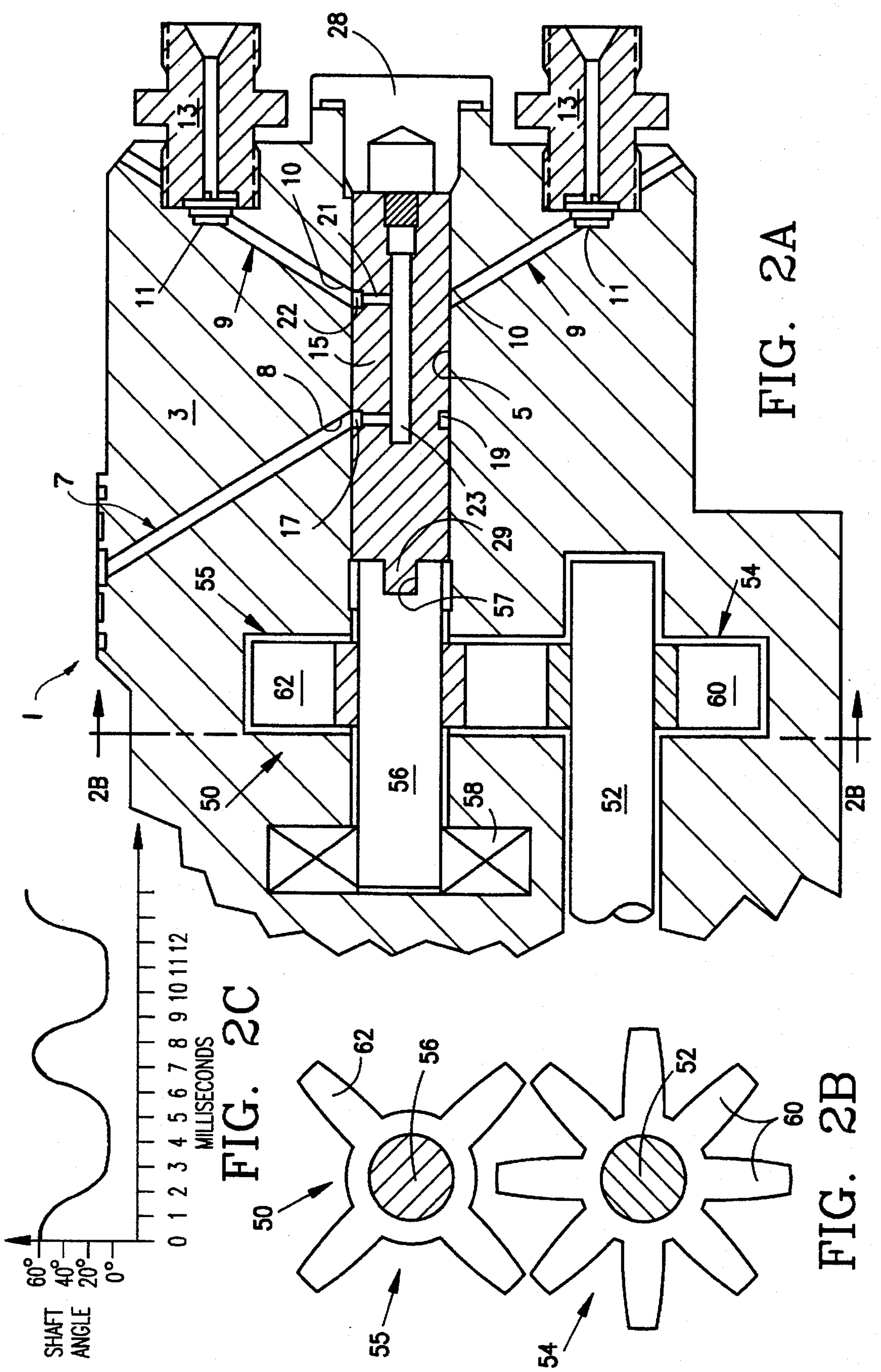
FIG. 2A is a side, cross-sectional view of a second embodiment of the fuel distribution valve that employs timing gears in its drive mechanism.
FIG. 2B is a cross-sectional view of the fuel distribution valve illustrated in FIG. 2A along the line 2B—2B.
FIG. 2C is a graph illustrating the dwell of the fuel distribution shaft obtained by the timing gear used in the second embodiment.

The drive mechanism 50 of the second embodiment of the fuel distribution valve 1 illustrated in FIGS. 2A and 2B utilizes a timing gear to achieve a stepped rotational movement of the fuel distribution shaft 15. To this end, drive mechanism 50 includes a drive shaft 52 that is linked to the engine crankshaft (not shown). Shaft 52 drives gear 54. Gear 54 is in turn meshed with a timing gear 55 that is rotatably mounted on a driven shaft 56. On one end, the driven shaft 56 includes a recess 57 for receiving the keyway 29 of the fuel distribution shaft 15. On its opposite end, the driven shaft 56 is rotatably mounted within a bearing 58. As may be seen in FIG. 2B, drive gear 54 has more teeth 60 than timing gear 55. Accordingly, while timing gear 55 rotates the same average numbers of rpms as drive gear 54, its rotational movement is accompanied by dwell times as is indicated in the graph of FIG. 2C. These dwell times are coordinated with the strokes of the injection pump (not shown) generating the pressurized pulses of fuel so that they correspond with the registration of the discharge port 21 of the fuel distribution shaft 15 and the inlet 10 of one of the fuel distributing passages 9. Such coordination is easily implemented since both the injection pump and drive shaft 52 are ultimately driven by the engine crankshaft.

Figure 3A:
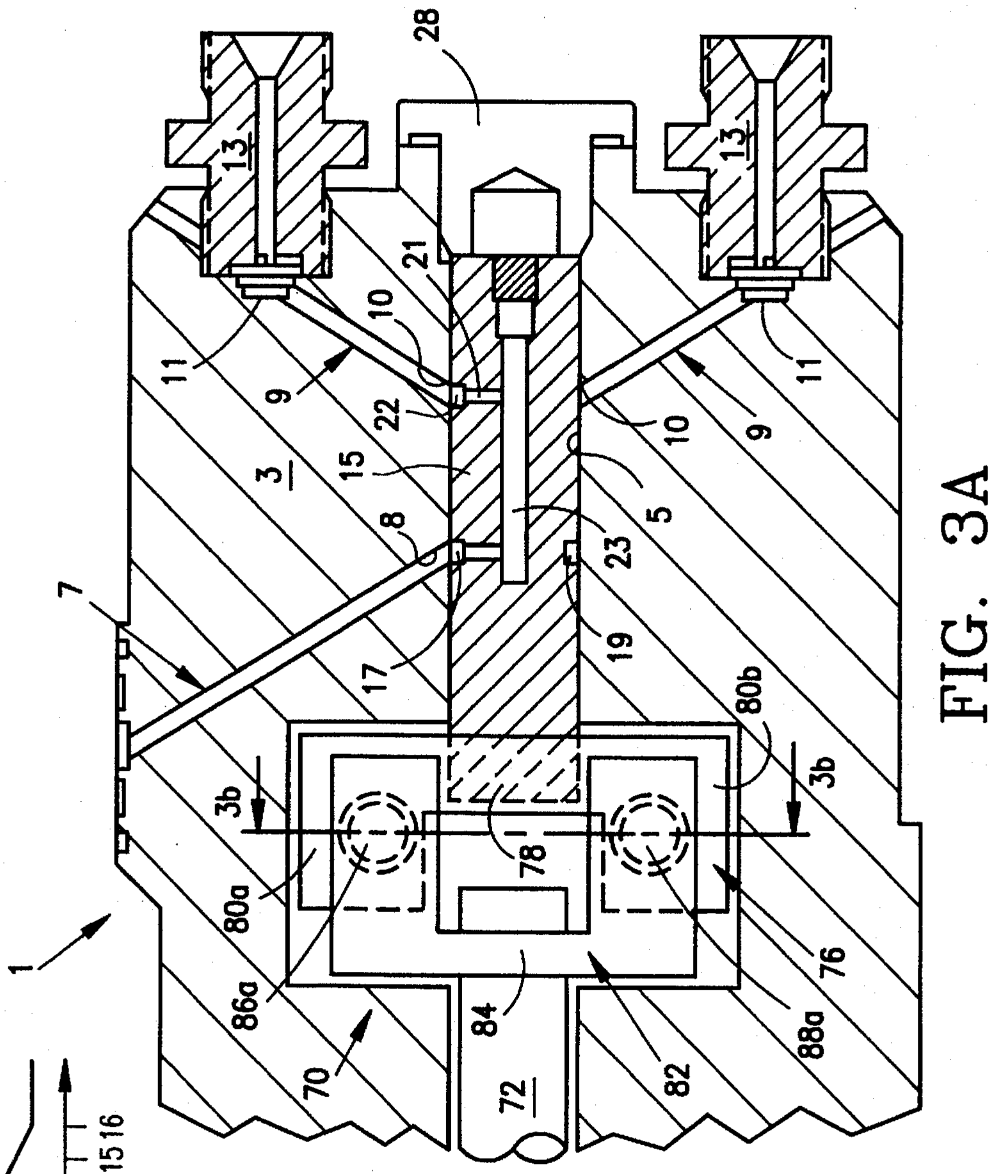
FIG. 3A is a third embodiment of the fuel distribution valve of the invention that employs a spring coupling in its drive mechanism.
Figure 3B:
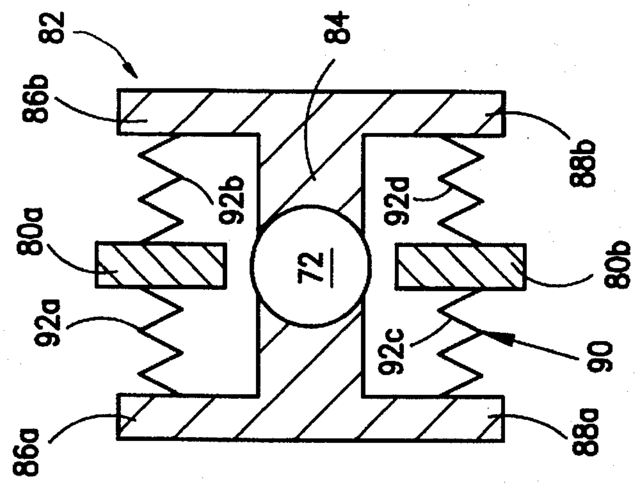
FIG. 3B is a cross-sectional view of the spring coupling illustrated in FIG. 3A along the line 3B—3B.

FIGS. 3A and 3B illustrate the drive mechanism 70 associated with the third embodiment of the fuel distribution valve 1. In this embodiment of the invention, the stepped motion of the fuel distribution shaft 15 is obtained by means of a drive coupling having torsional springs. Specifically, drive mechanism 70 comprises a drive shaft 72 connected on one end to the crankshaft of the engine, and having a drive coupling 74 on its other end. As may be seen in both FIGS. 3A and 3B, the drive coupling 74 includes a yoke member 76 having a center portion 78 that is rigidly affixed within a slot (not shown) provided at the end of the fuel distribution shaft 15. Yoke member 76 further includes a pair of spaced apart legs 80*a*, *b* that are integrally connected to the center portion 78. The drive coupling 74 further comprises an H-shaped member 82 having a center portion 84 which is rigidly affixed to the previously mentioned drive shaft 72. H member 82 has upper legs 86*a*, *b* and lower legs 88*a*, *b* which capture the legs 80*a*, *b* of the previously described yoke member 76. A spring assembly 90 is formed from four coil springs 92*a–d* disposed between the yoke legs 80*a,b* and the upper and lower legs 86*a*, *b* and 88*a*, *b* of the H member 82.

Figure 3C:
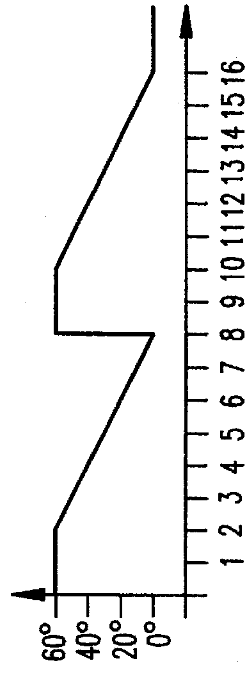
FIG. 3C is a graph illustrating the dwell of the fuel distribution shaft obtained by the spring drive coupling used in the third embodiment.
Figure 4A:
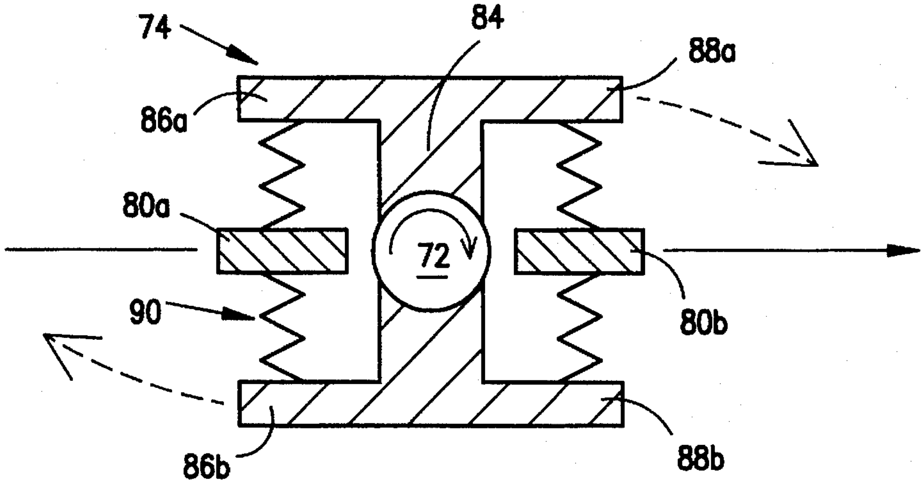
FIGS. 4A, 4B, and 4C are cross-sectional views of the spring drive coupling illustrated in FIG. 3A in operation as it steppingly drives the fuel distribution shaft between one fuel distributing passage to another.
Figure 4B:
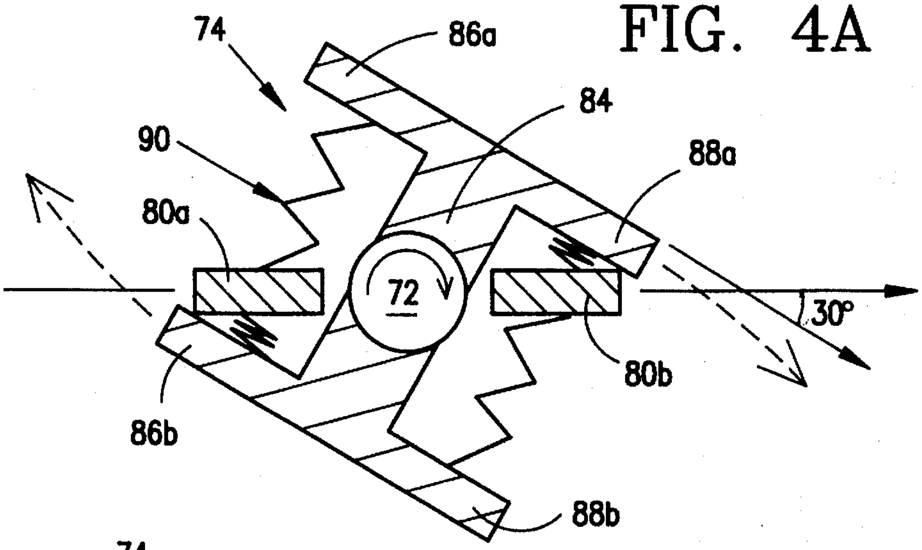
Figure 4C:
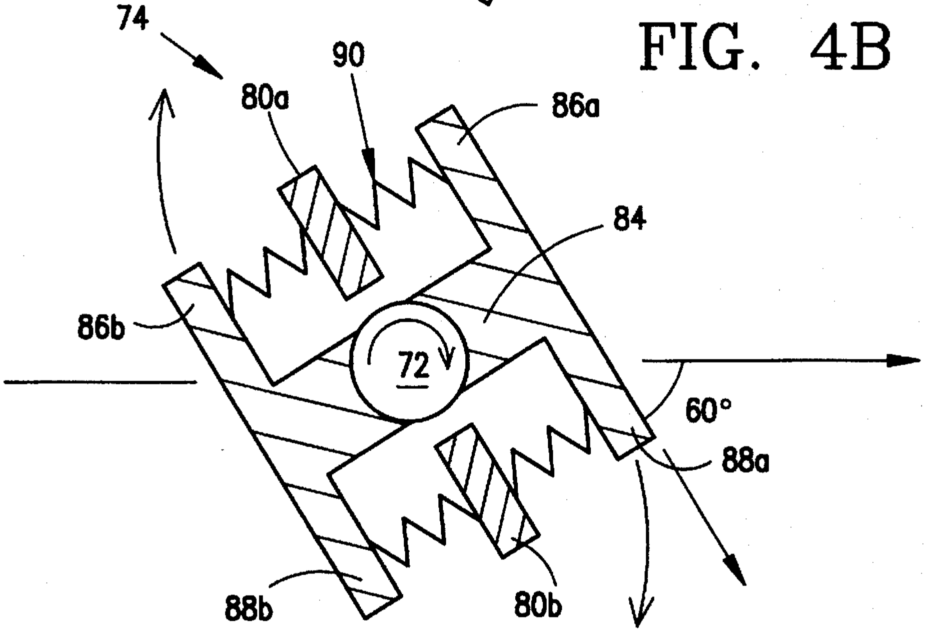

FIGS. 4A through 4C illustrate how the drive coupling 74 of the mechanism 70 achieves a desired stepped rotational movement of the fuel distribution shaft 15. Specifically, FIG. 4A illustrates how the coupling 74 appears in cross-section when the fuel discharge port 21 is in alignment with the inlet 10 of one of the fuel distributing passages 9, and a pressurized pulse of fuel has just begun to flow from the port 21 to the passageway 9. Under such circumstances, the side load that the pulse applies to the shaft 15 creates a momentary frictional engagement between the shaft 15 and the walls of the surrounding bore 5. This frictional engagement is sufficiently strong to overcome the torsional force applied to the shaft 15 by the spring assembly 90 as the drive shaft 72 turns to the H member 82 to the position illustrated in FIG. 4B. However, at some point between an angular turning of 30° and 60° of the H member 82, the frictional engagement between the shaft 15 and the walls of the bore 5 diminishes as the last of the pressurized pulse of fuel is finally received into one of the fuel distributing passages 9, at which point the restorative force of the coil springs 92*a–d* pushes the yoke legs 80*a*, *b* back into a central position as illustrated in FIG. 4C. Such repositioning of the yoke legs 80*a*, *b* also repositions the discharge port 21 of the fuel distributing shaft 15 with the inlet 10 of the next angularly adjacent fuel distributing passage 9 whereupon the entire process repeats itself. The dwell times achieved by such a drive coupling 74 are set forth in the graph illustrated in FIG. 3C, wherein the ordinate represents the angular position of the shaft 15, and the abscissa represents time.

While this invention has been described with respect to three preferred embodiment, various modifications, variations, and additions will become evident to persons of ordinary skill in the art. All such additions, modifications, and variations are encompassed within the scope of this invention, which is limited only by the claims appended hereto.

What is claimed:

1. A fuel distribution valve for receiving metered, pressurized fuel pulses and conducting said fuel pulses to the combustion cylinders of an internal combustion engine, comprising:

a distributor housing having an elongated bore, a fuel receiving passage in communication with a side portion of said bore for conducting metered pressurized pulses of fuel, and a plurality of fuel distributing passages in communication with another side portion of said bore;

a fuel distribution shaft rotatably mounted in said bore including axially spaced, mutually communicating fuel receiving and fuel discharging ports in a side of said shaft that are registrable with said fuel receiving and fuel distributing passages of said housing as said shaft rotates, and drive means for intermittently rotating said fuel distributor shaft such that said shaft discharge port dwells in registration with one of said fuel distributing passages in said housing whenever a pressurized pulse of fuel is discharged from said housing passageway and through said shaft discharge port to prevent said shaft from rotating during a high side load.

2. The fuel distribution valve of claim 1, wherein said drive means includes a stepper motor coupled to said fuel distribution shaft and electrically connected to a timing control circuit for intermittently actuating said stepper motor only in time periods between said discharge of said pressurized pulses of fuel.

3. The fuel distribution valve of claim 2, wherein said timing control circuit includes a microprocessor having an output electrically connected to a switching circuit for controlling a flow of electric power to said stepper motor.

4. The fuel distribution valve of claim 3, wherein said microprocessor further has an input electrically connected to an encoder assembly for generating an electrical signal indicative of an angular position of said fuel distribution shaft corresponding to registration between said fuel discharge port and one of said distribution passageways.

5. The fuel distribution valve of claim 1, wherein said drive means includes a drive gear connected to a drive shaft, and a timing gear connected to said fuel distribution shaft and meshing with said drive gear, wherein said timing gear provides a dwell whenever said discharge port of said shaft is aligned with a fuel distribution passage in said housing.

6. The fuel distribution valve of claim 5, wherein said drive shaft is operatively connected to a crankshaft of said internal combustion engine such that the speed of rotation of said drive gear is proportional to the speed of rotation of said crankshaft.

7. The fuel distribution valve of claim 5, wherein the time period of said dwell is longer than the time period of said pulse of fuel.

8. The fuel distribution valve of claim 1, wherein said drive means includes a drive shaft, and a spring drive coupling connected between said drive shaft and said fuel distribution shaft, said coupling including a torsional spring means for providing a dwell in the rotation of said distribution shaft upon the application of a side load to said shaft by said discharge of said pressurized pulse of fuel through said shaft discharge port.

9. The fuel distribution valve of claim 8, wherein said drive shaft is operatively connected to a crankshaft of said internal combustion engine such that the speed of rotation of said drive gear is proportional to the speed of rotation of said crankshaft.

10. The fuel distribution valve of claim 8, wherein the time period of said dwell is longer than the time period of said pulse of fuel.

11. A fuel distribution valve for receiving metered, pressurized fuel pulses and conducting said fuel pulses to the combustion cylinders of an internal combustion engine, comprising:

a distributor housing having an elongated bore, a fuel receiving passage in communication with a side portion of said bore for conducting said metered, pressurized fuel pulses, and a plurality of fuel distributing passages uniformly angularly spaced around another side portion of said bore that is axially spaced apart from said first side portion;

a fuel distribution shaft rotatably mounted in said bore of said housing including axially spaced, mutually communicating fuel receiving and fuel discharge ports in a side of said shaft that are simultaneously registrable with said fuel receiving and fuel distributing passages of said housing as said shaft rotates, and drive means for intermittently rotating said fuel distributor shaft such that said shaft distribution port dwells in registration with one of said fuel distributing passages in said housing whenever a pressurized pulse of fuel is discharged from said housing passageway and through said shaft discharge port, the time period of said dwell being at least as long as the time period of said fuel pulse to prevent said shaft from rotating during a high side load generated by said pressurized fuel pulses.

12. The fuel distribution valve of claim 11, wherein the pressure associated with said pressurized fuel pulses is about 20,000 psi.

13. The fuel distribution valve of claim 11, wherein said drive means includes a stepper motor coupled to said fuel distribution shaft and electrically connected to a timing control circuit for intermittently actuating said stepper motor only in time periods between said discharge of said pressurized pulses of fuel.

14. The fuel distribution valve of claim 13, wherein said timing control circuit includes a microprocessor having an output electrically connected to a switching circuit for controlling a flow of electric power to said stepper motor.

15. The fuel distribution valve of claim 14, wherein said microprocessor further has an input electrically connected to an encoder assembly for generating an electrical signal indicative of an angular position of said fuel distribution shaft corresponding to registration between said fuel discharge port and one of said distribution passageways.

16. The fuel distribution valve of claim 11, wherein said drive means includes a drive gear connected to a drive shaft, and a timing gear connected to said fuel distribution shaft and meshing with said drive gear, wherein said timing gear provides a dwell whenever said discharge port of said shaft is aligned with a fuel distribution passage in said housing, and wherein said drive shaft is operatively connected to a crankshaft of said internal combustion engine such that the speed of rotation of said drive gear is proportional to the speed of rotation of said crankshaft.

17. The fuel distribution valve of claim 11, wherein said drive means includes a drive shaft, and a spring drive coupling connected between said drive shaft and said fuel distribution shaft, said coupling including a torsional spring means for providing a dwell in the rotation of said distribution shaft upon the application of a side load to said shaft by said discharge of said pressurized pulse of fuel through said shaft discharge port, and wherein said drive shaft is operatively connected to a crankshaft of said internal combustion engine such that the speed of rotation of said drive gear is proportional to the speed of rotation of said crankshaft.

18. The fuel distribution valve of claim 17, wherein said spring drive coupling includes a driven shaft, and a torsional spring assembly for interconnecting said drive shaft to said driven shaft, wherein said torsional spring assembly has an angular stroke equal to the angular distance between two adjacent fuel distributing passages in said housing.

19. The fuel distribution valve of claim 11, wherein said engine is a diesel engine.

20. A method for distributing metered, pressurized fuel pulses to the combustion cylinders of an internal combustion engine by means of a distributor valve having a fuel distribution shaft rotatably mounted in a bore in a distributor housing, wherein said shaft has a discharge port for sequentially discharging said fuel pulses into a plurality of angularly spaced fuel distributing passages communicating with said housing bore, comprising the step of intermittently rotating said shaft in said bore such that the angular position of said shaft dwells in registration with one of said distributing passages whenever a fuel pulse is discharged from said shaft discharge port to prevent said shaft from rotating during a high side load.

* * * * *